(12) United States Patent
Segawa et al.

(10) Patent No.: US 7,527,892 B2
(45) Date of Patent: May 5, 2009

(54) NONAQUEOUS ELECTROLYTE BATTERY HAVING EXPOSED ELECTRODE COLLECTOR PORTIONS

(75) Inventors: Ken Segawa, Miyagi (JP); Shigeru Fujita, Miyagi (JP); Hideaki Ojima, Miyagi (JP); Takashi Tomita, Miyagi (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 10/156,283

(22) Filed: May 28, 2002

(65) Prior Publication Data

US 2002/0182484 A1 Dec. 5, 2002

(30) Foreign Application Priority Data

Feb. 13, 1998 (JP) ............................... P10-031820

(51) Int. Cl.
*H01M 4/00* (2006.01)
(52) U.S. Cl. .............................. 429/94; 429/57; 429/59; 429/60; 429/61
(58) Field of Classification Search .................... 429/94, 429/57, 59–61
See application file for complete search history.

(56) References Cited

U.S. PATENT DOCUMENTS 5,344,724 A * 9/1994 Ozaki et al. .................... 429/94
6,325,611 B1 12/2001 Iwasaki et al.

FOREIGN PATENT DOCUMENTS

| EP | 0 780 920 A1 | 6/1997 |
| EP | 1 089 370 A1 | 4/2001 |
| JP | 06-111848 A * | 4/1994 |
| JP | 09-180751 | 7/1997 |
| JP | 09 180761 A | 7/1997 |
| JP | 11-144765 | 5/1999 |
| JP | 11-176478 | 7/1999 |
| JP | 2000 067906 A | 3/2000 |

OTHER PUBLICATIONS

IPDL JPO machine translation for JP 09-180761 A (publication date of Jul. 1997).*
The IPDL JPO Machine Translation for JP 06-111848 (publication date of Apr. 1994).*
JP 10-031820 reference Japanese Office Action issued on Oct. 20, 2006.

* cited by examiner

*Primary Examiner*—Jane Rhee
(74) *Attorney, Agent, or Firm*—Sonnenschein Nath & Rosenthal LLP (57) ABSTRACT

A nonaqueous electrolyte battery capable of minimizing damage if the battery is crushed by pressure is disclosed. The nonaqueous electrolyte battery according to the present invention includes a spiral coil formed by, through a separator, winding a positive electrode having an elongated positive-electrode collector with two sides on each of which an active material for the positive electrode has been formed and a negative electrode having an elongated negative-electrode collector with two sides on each of which an active material for the negative electrode has been formed. Wherein the positive electrode has a lengthwise directional end which has two sides, each of which is provided with a positive-electrode-collector exposed portion in which a positive-electrode collector is exposed, the negative electrode has a lengthwise directional end which has two sides, each of which is provided with a negative-electrode-collector exposed portion in which a negative-electrode collector is exposed, and the positive-electrode-collector exposed portion and the negative-electrode-collector exposed portion cover the coil one or more times through the separator.

20 Claims, 5 Drawing Sheets

NONAQUEOUS ELECTROLYTE BATTERY HAVING EXPOSED ELECTRODE COLLECTOR PORTIONS

BACKGROUND OF THE INVENTION

1. Field of the Invention

The present invention relates to a nonaqueous electrolyte battery containing nonaqueous solvent as solvent of an electrolyte thereof.

2. Related Background Art

A lithium secondary battery containing nonaqueous electrolyte incorporates a positive electrode which is usually constituted by applying, to aluminum foil, metal oxide and the like serving as an active material for the positive electrode. Moreover, a negative electrode of the battery is constituted by crimping, to copper foil, lithium serving as an active material for the negative electrode. In addition, a separator constituted by a finely-porous film made of polyethylene is disposed between the two electrodes obtained as described above. A coil constituted by winding and stacking the obtained structure is accommodated in a can made of stainless steel and serving as an external electrode (for example, an external negative electrode).

The above-mentioned lithium secondary battery has characteristics of a large capacity, high voltage and a large output. If the circuit or the like under abnormal conditions causes the positive electrode and the negative electrode of the battery to be short-circuited, the temperature of the battery is undesirably raised. To prevent rise in the temperature of the battery, a variety of protective means, such as a temperature fuse, an electric current fuse and a PTC device are provided for the battery. In addition, a safety valve for preventing rise in the pressure in the battery is provided.

However, a variety of abnormal states are assumed to occur as well as the short circuit of the positive electrode and the negative electrode of the battery caused from an abnormal state of the circuit in the battery. If the battery is crushed by external pressure by accident, the separator between the positive electrode and the negative electrode is broken or melted. Thus, the positive electrode and the negative electrode are short-circuited. If the positive electrode and the negative electrode are short-circuited, there is apprehension that the battery is damaged by heat, smoke or the like.

SUMMARY OF THE INVENTION

In view of the foregoing, an object of the present invention is to provide a nonaqueous electrolyte battery which is capable of minimizing damage thereof even if the battery is crushed by dint of pressure.

According to one aspect of the present invention, there is provided a nonaqueous electrolyte battery comprising: a spirally coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the negative electrode has been formed, wherein the positive electrode has a lengthwise directional end which has two sides each of which is provided with a positive-electrode-collector exposed portion in which a positive-electrode collector is exposed, the negative electrode has a lengthwise directional end which has two sides each of which is provided with a negative-electrode-collector exposed portion in which a negative-electrode collector is exposed, and the positive-electrode-collector exposed portion and the negative-electrode-collector exposed portion cover the coil one or more times through the separator.

The nonaqueous electrolyte battery according to the present invention incorporates the coil covered with the positive-electrode-collector exposed portion and the negative-electrode-collector exposed portion. Therefore, even if the battery is crushed with pressure, the positive-electrode-collector exposed portion and the negative-electrode-collector exposed portion are first short-circuited. The nonaqueous electrolyte battery according to the present invention enables heat produced by dint of short circuit between the positive-electrode-collector exposed portion and the negative-electrode-collector exposed portion to be diffused. Therefore, any critical influence is exerted on the active materials for the electrodes. As a result, damage of the overall body of the battery can be prevented.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings.

Figure 1:
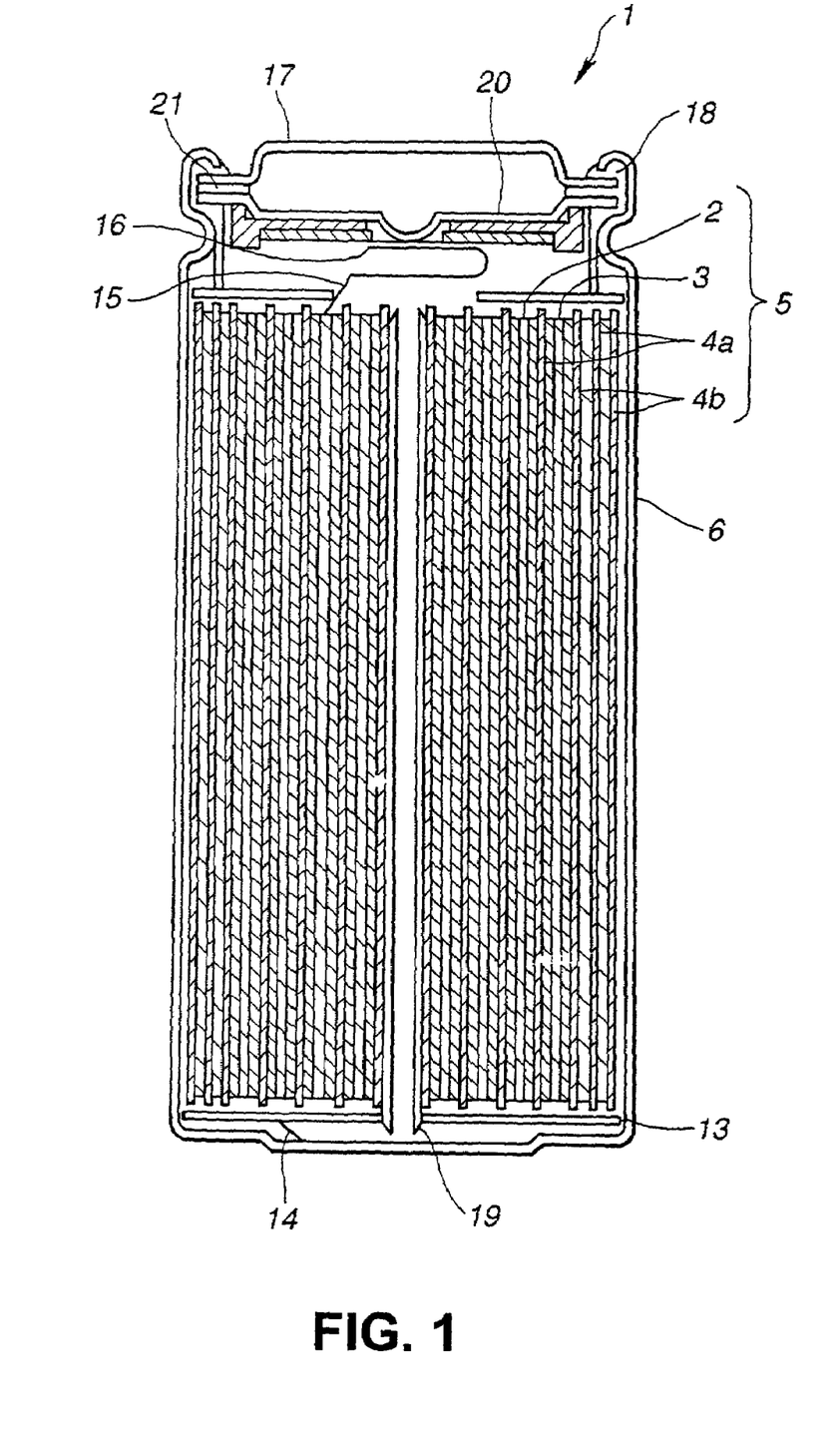
FIG. 1 is a vertical cross sectional view showing an example of the structure of a nonaqueous electrolyte battery according to the present invention.

FIG. 1 is a vertical cross sectional view showing an example of the structure of a nonaqueous electrolyte battery according to the present invention.

The nonaqueous electrolyte battery 1 incorporates a spirally coil 5 constituted by, in a hermetic state, winding an elongated positive electrode 2 and an elongated negative electrode 3 through separators 4a and 4b. The spirally coil 5 is accommodated in a battery can 6.

Figure 2:
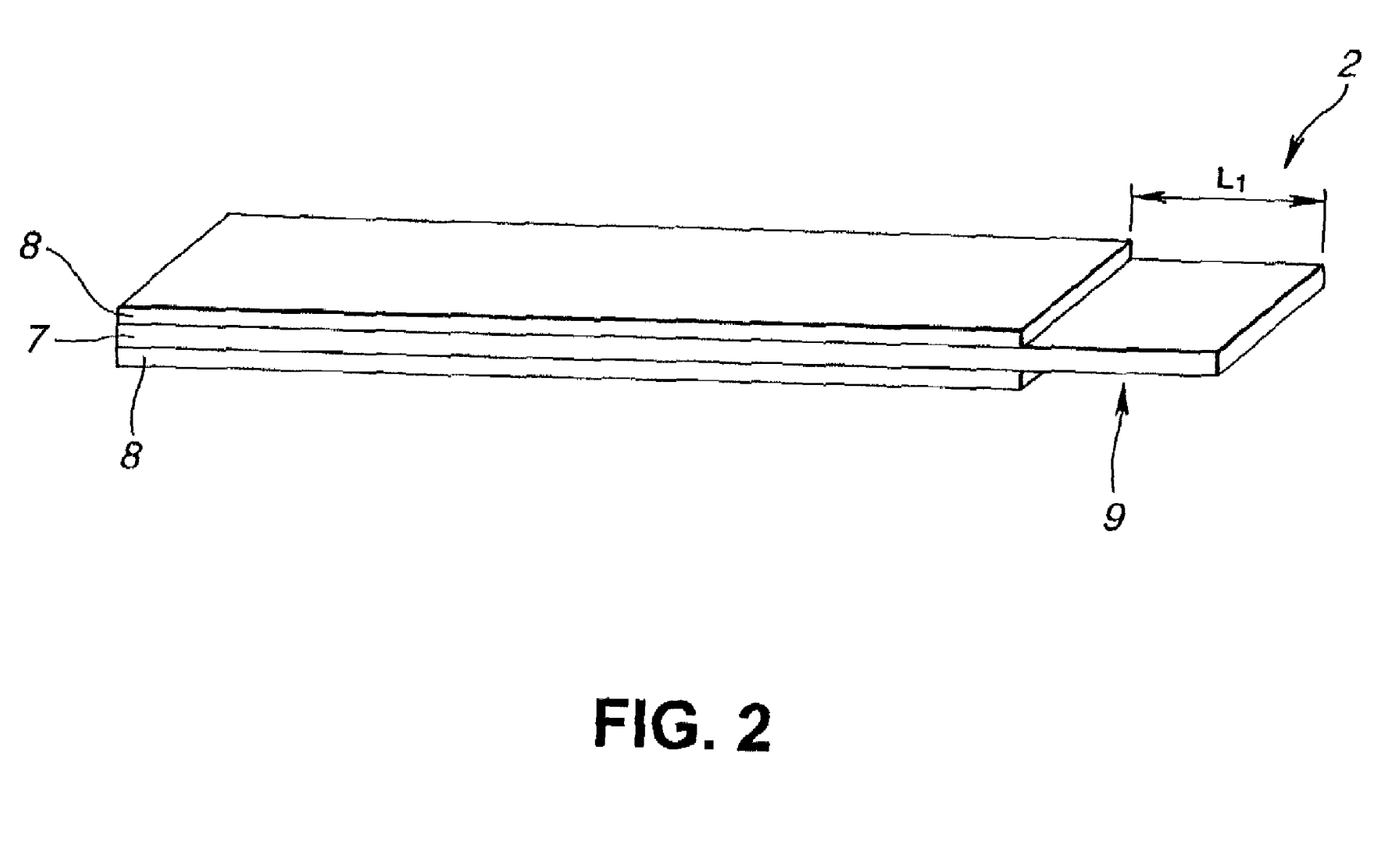
FIG. 2 is a perspective view showing an example of the structure of a positive electrode.

As shown in FIG. 2, the positive electrode 2 has a positive-electrode collector 7 having two sides on each of which a positive-electrode active material layer 8 is formed. When the positive electrode 2 is manufactured, 91 wt % of $MnO_2$, which is a material for the positive electrode, 6 wt % of a conductive material and 3 wt % of a binder are mixed with one another. Thus, a positive electrode mix is prepared. It is preferable that the material for the positive electrode contain Li in a sufficiently large quantity. For example, a composite metal oxide and an interlayer compound containing Li are suitable materials, the composite metal oxide being composed of lithium expressed by, for example, $LiMO_2$ (where M is at least one type of a material selected from Co, Ni, Mn, Fe, Al, V and Ti) and transition metal.

The conductive material for imparting conductivity to the positive electrode and the binder for joining the material for the positive electrode to the positive electrode collector may be conventional materials.

The conductive material may be graphite or carbon black, while the binder may be made of fluororesin, such as polyvinylidene fluoride.

Then, the positive electrode mix is dispersed in N-methyl-2-pyrolidone so as to be slurried. The slurry positive-electrode mix is uniformly applied to each of the two surfaces of aluminum foil which will be formed into a positive-electrode collector 7 and which has a thickness of, for example 20 μm, and then it is dried. Thus, a positive-electrode active material layer 8 is formed so that the positive electrode 2 is manufactured.

The positive electrode 2 has a positive-electrode-collector exposed portion 9 formed at a lengthwise directional end thereof. The positive-electrode-collector exposed portion 9 has two surfaces on each of which the positive-electrode active material layer 8 is not formed so that the positive-electrode collector 7 is exposed.

The end portion formed into the positive-electrode-collector exposed portion 9 serves as an outer portion of the spirally coil 5 formed by the winding operation. The positive-electrode-collector exposed portion 9 covers the spirally coil 5 at least one time. Assuming that the outer diameter of the spirally coil 5 is d, length $L_1$ of the positive-electrode-collector exposed portion 9 is πd or longer.

Figure 3:
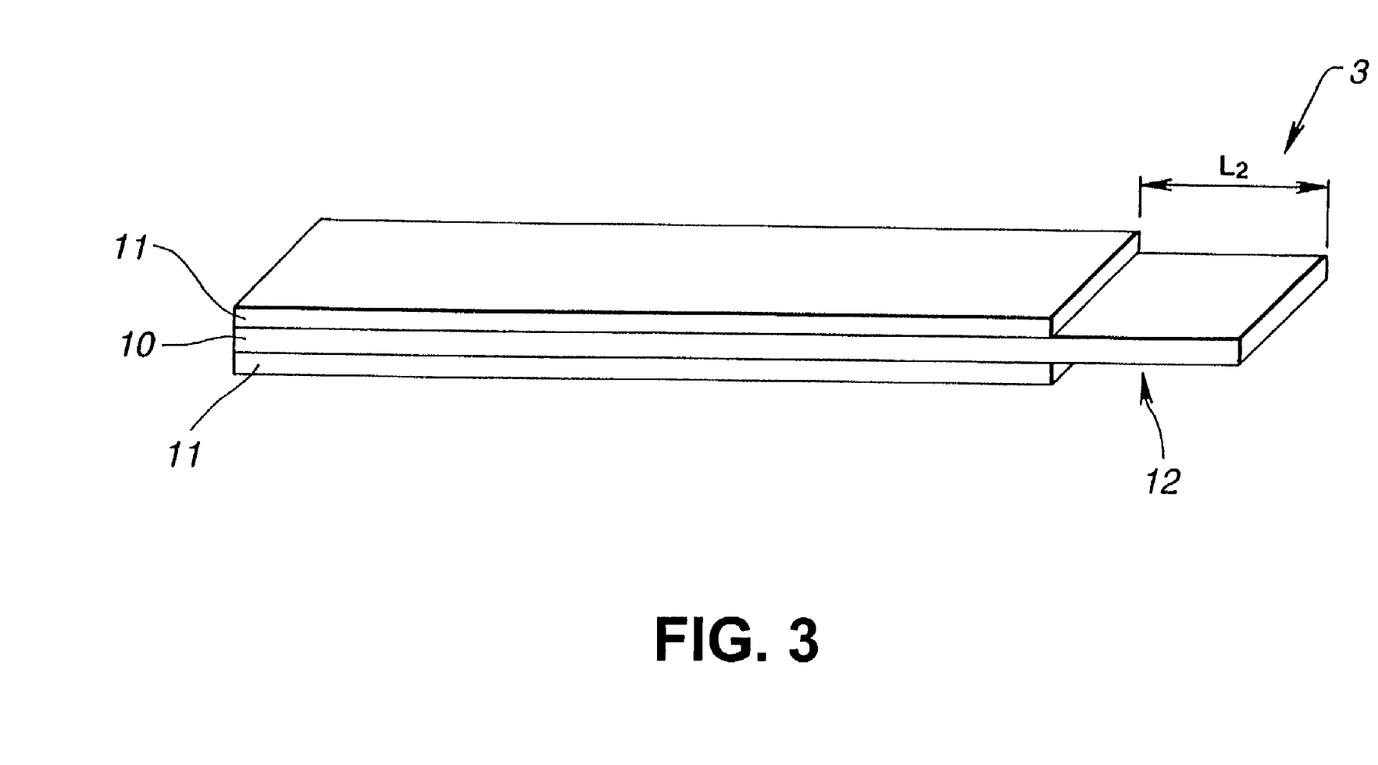
FIG. 3 is a perspective view showing an example of the structure of a negative electrode.

As shown in FIG. 3, the negative electrode 3 incorporates the negative-electrode collector 10 which has two surfaces on each of which a negative-electrode active material 11 is formed. The negative electrode 3 is manufactured by bonding, for example, metal lithium foil which serves as a negative-electrode active material 11 to copper foil which serves as the negative-electrode collector 10 and which has a thickness of, for example, 10 μm. The negative electrode 3 may be a structure obtained by applying, to the negative-electrode collector 10, a material for a negative electrode, which permits doping/dedoping of lithium ions, and the binder.

The material for the negative electrode may be, for example, a carbon material. The carbon material is exemplified by thermal decomposition carbon, cokes (pitch cokes, needle cokes, petroleum cokes or the like), graphite, vitreous carbon, a calcinated organic polymer compound (a material obtained by calcinating phenol resin, furan resin or the like), carbon fiber and active carbon. The material for the negative electrode may be crystalline or amorphous metal oxide which permits doping/dedoping of lithium ions, as well as the carbon material.

The binder for joining the material for the negative electrode to the negative-electrode collector may be a conventional material. For example, the binder may be fluororesin, such as polyvinylidene fluoride.

The negative electrode 3 has a negative-electrode-collector exposed portion 12 formed at a lengthwise directional end thereof. The negative-electrode-collector exposed portion 12 has two surfaces on each of which the negative-electrode active material 11 is not formed so that the negative-electrode collector 10 is exposed.

The end portion formed into the negative-electrode-collector exposed portion 12 serves as an outer portion of the spirally coil 5 formed by the winding operation. The negative-electrode-collector exposed portion 12 covers the spirally coil 5 at least one time. Assuming that the outer diameter of the spirally coil 5 is d, length $L_2$ of the negative-electrode-collector exposed portion 12 is πd or longer.

The spirally coil 5 is formed by spirally winding a member formed by stacking, in this sequential order, the positive electrode 2, the separator 4a, the negative electrode 3 and the separator 4b.

Each of the separators 4a and 4b is made of an insulating material having a relatively high specific heat. Each of the separators 4a and 4b is constituted by a finely-porous polypropylene film having a thickness of about 25 μm.

The separator is not limited particularly. The separator may be woven fabrics, unwoven fabrics or a finely porous film made of synthetic resin or the like. Among the foregoing materials, a finely-porous film made of polyolefin is a preferred material from viewpoints of realizing a required thickness, strength of the formed film and resistance of the film. Specifically, any one of a polyethylene finely-porous film, a polypropylene finely-porous film, a finely-porous film and their mixture may be employed.

Figure 4:
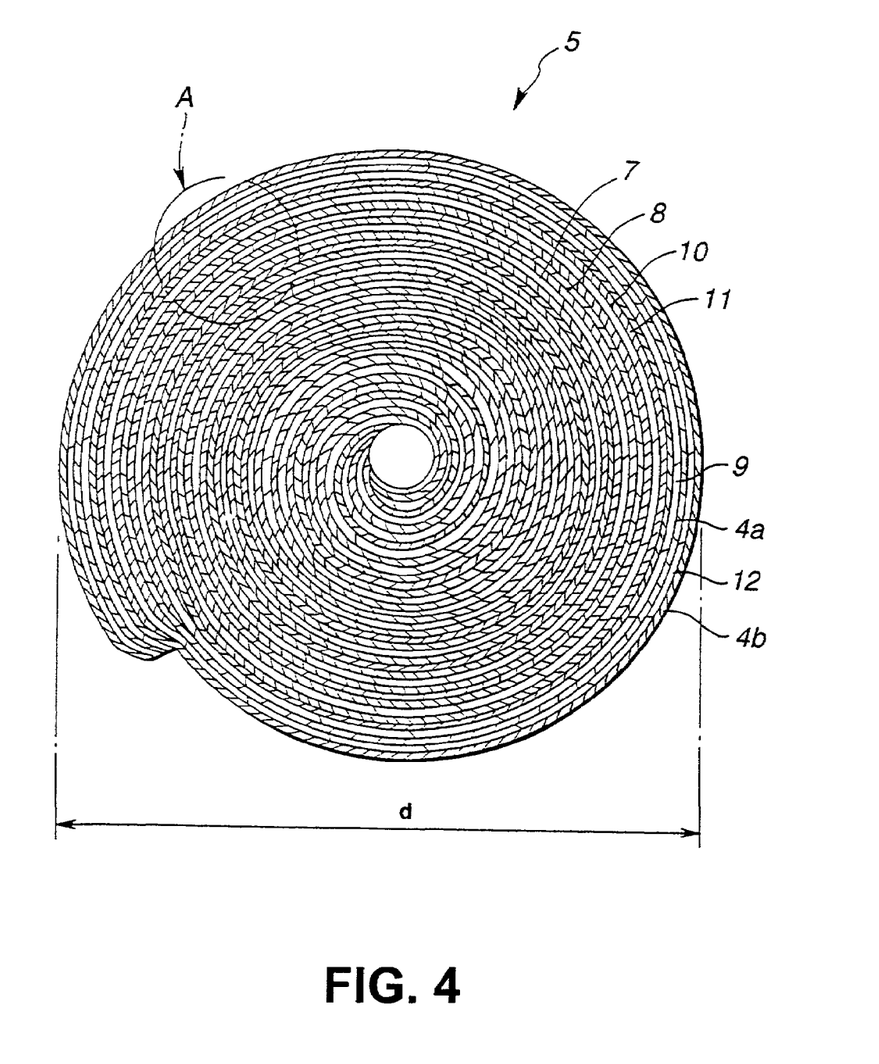
FIG. 4 is a lateral cross sectional view showing an example of the structure of a coil.
Figure 5:
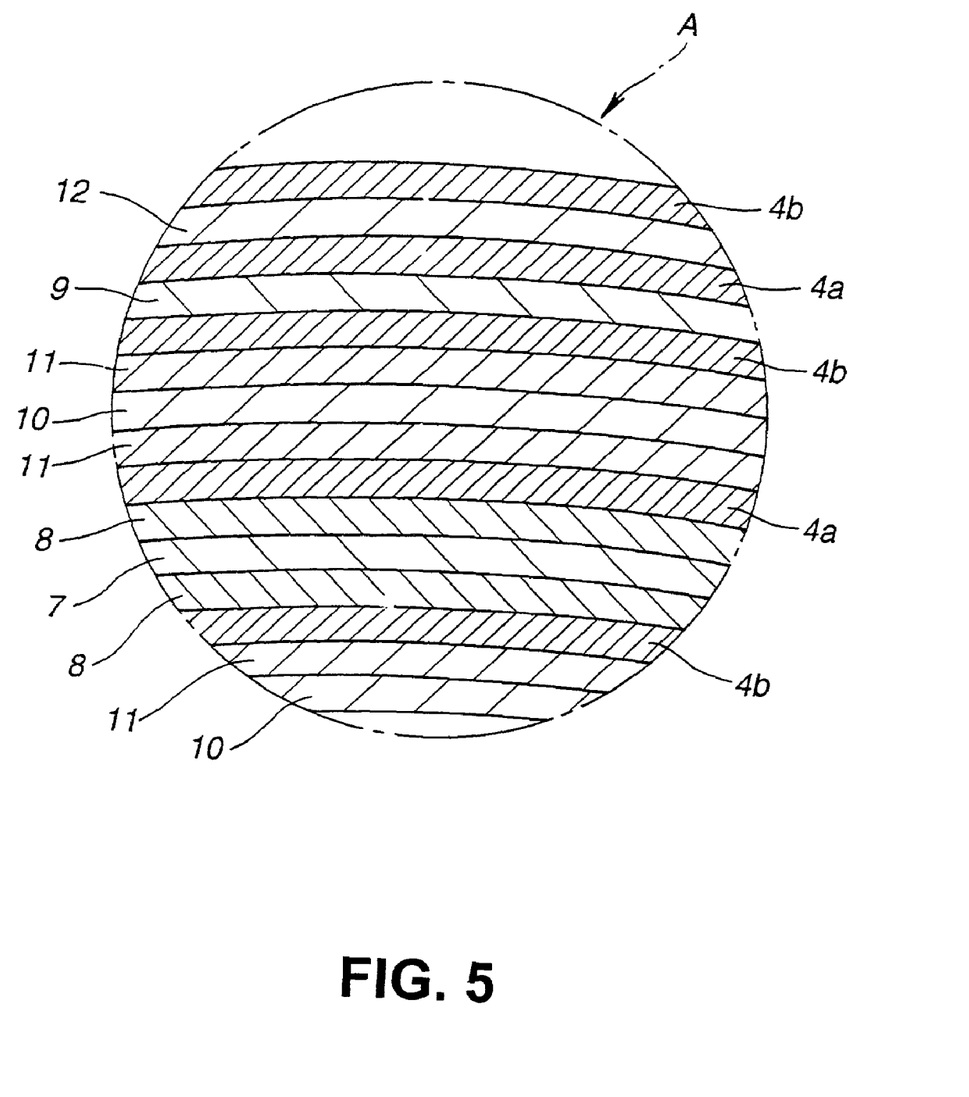
FIG. 5 is a lateral cross sectional view showing circle A shown in FIG. 4.

FIG. 4 is a lateral cross sectional view showing an example of the structure of the spirally coil 5. FIG. 5 is an enlarged view showing circle A shown in FIG. 4.

The spirally coil 5 is covered with the positive-electrode-collector exposed portion 9 and the negative-electrode-collector exposed portion 12 one or more times. Moreover, the outermost portion of the spirally coil 5 is formed into the separator 4b.

It is preferable that the negative electrode 3 of the spirally coil 5 is positioned outer than the positive electrode 2. Moreover, it is preferable that the negative-electrode-collector exposed portion 12 covers the positive-electrode-collector exposed portion 9. Since the negative electrode 3 is positioned outer than the positive electrode 2, short circuit in the battery can be prevented as described later.

The nonaqueous electrolyte battery 1 has the structure that the spirally coil 5 is accommodated in the battery can 6, as shown in FIG. 1.

To constitute the nonaqueous electrolyte battery 1 by accommodating the spirally coil 5 in the battery can 6, an insulating plate 13 is inserted into the bottom of the battery can 6 made of, for example, iron and previously plated with nickel. Thus, the spirally coil 5 is accommodated To collect electric currents of the negative electrode 3, an end of a negative-electrode lead 14 made of, for example, nickel, is crimped to the negative electrode 3. Another end of the negative-electrode lead 14 is welded to the battery can 6. As a result, the battery can 6 is electrically conducted to the negative electrode 3 so as to be formed into an external negative electrode of the nonaqueous electrolyte battery 1. To collect electric currents of the positive electrode 2, an end of a positive-electrode lead 15 made of, for example, aluminum, is joined to the positive electrode 2. Another end of the positive-electrode lead 15 is electrically connected to a battery cover 17 through a current-interrupting thin plate 16. The current-interrupting thin plate 16 interrupts an electric current to correspond to the internal pressure of the battery. As a result, the battery cover 17 and the positive electrode 2 are electrically conducted to each other so as to be formed into the external positive electrode of the nonaqueous electrolyte battery 1.

The negative electrode 3 of the spirally coil 5 is positioned outer than the positive electrode 2. Therefore, short circuit between the battery can 6 electrically conducted to the negative electrode 3 and the positive electrode 2 occurring in the battery can be prevented even if the separator 4b which is the outermost element of the spirally coil 5 is curled up. As a result, the manufacturing yield can be improved.

Then, a nonaqueous electrolyte is injected into the battery can 6. The nonaqueous electrolyte is prepared by dissolving $LiPF_6$, which is an electrolyte, in mixed solvent prepared by mixing 50 vol % of propylene carbonate, which is organic solvent, and 50 vol % di-methoxyehtane. The dissolving ratio with respect to the mixed solvent is 1 mol/l.

The organic solvent, which is not limited particularly, is exemplified by propylene carbonate, ethylene carbonate, 1,2-dimethoxyethane, 1,2-diethoxyethane, diethylcarbonate, γ-butyrolactone, tetrahydrofuran, 1,3-dioxolane, 4-methyl-1,3-dioxolane, diethylether, sulfolane, methylsulfolane, acetonitrile and propionitrile. The foregoing material is used solely or two or more types of the materials are used as mixed solvent.

The electrolyte, which is not limited particularly, is exemplified by $LiClO_4$, $LiAsF_6$, $LiPF_6$, $LiBF_4$, $LiB(C_6H_5)_4$, $LiCl$, $LiBr$, $LiSO_3CH_3$ and $LiSO_3CF_3$.

Finally, the battery can 6 is crimped through an insulating sealing gasket 18 applied with asphalt so that the battery cover 17 is secured. As a result, the cylindrical nonaqueous electrolyte battery 1 can be manufactured.

The nonaqueous electrolyte battery 1 has a center pin 19 which is connected to the positive-electrode lead 15 and the negative-electrode lead 14. Moreover, a safety valve unit 20 for removing gas in the battery if the pressure in the battery is raised to a level higher than a predetermined level is provided for the nonaqueous electrolyte battery 1. In addition, a PTC (Positive Temperature Coefficient) device 21 for preventing rise in the temperature in the battery is provided for the nonaqueous electrolyte battery 1.

The problem of heat and smoke caused from crush of the nonaqueous electrolyte battery with external pressure will now be described. If the battery can is crushed with external pressure, the separator is initially broken. Thus, the positive electrode and the negative electrode are short-circuited in the battery, causing heat to be produced. The heat causes reactions to take place and thus smoke is produced.

If the nonaqueous electrolyte battery 1 encounters an abnormal state such as crush of the battery body, the positive-electrode-collector exposed portion 9 and the negative-electrode-collector exposed portion 12 are, at the outer periphery of the spirally coil 5, short-circuited initially. The short circuit between the positive-electrode-collector exposed portion 9 and the negative-electrode-collector exposed portion 12 occurs at a position apart from the positive-electrode active material layer 8 and the negative-electrode active material 11. Moreover, separators 4a and 4b each having a relatively high specific heat are disposed around the position at which the short circuit has taken place. Therefore, even if heat is produced owning to the short circuit between the positive-electrode-collector exposed portion 9 and the negative-electrode-collector exposed portion 12, heat can be diffused. As a result, a critical influence is not exerted on the active material layer for the electrode.

Therefore, damage, such as heat and smoke, which exerts an effect on the overall body of the battery can satisfactorily be prevented. As a result, a nonaqueous electrolyte battery 1 exhibiting excellent safety can be obtained.

If the length of the positive-electrode-collector exposed portion 9 or that of the negative-electrode-collector exposed portion 12 is shorter than πd, the positive-electrode-collector exposed portion 9 and the negative-electrode-collector exposed portion 12 cannot cover the spirally coil 5 one or more times. A state in which the spirally coil 5 is not covered by the positive-electrode-collector exposed portion 9 and the negative-electrode-collector exposed portion 12 one or more times will now be described. If the battery is crushed at a position which is not covered with the positive-electrode-collector exposed portion 9 and the negative-electrode-collector exposed portion 12, the positive-electrode-collector exposed portion 9 and the negative-electrode-collector exposed portion 12 cannot first be short-circuited. Therefore, damage cannot be minimized.

If the positive-electrode-collector exposed portion 9 or the negative-electrode-collector exposed portion 12 is provided for only one side, short circuit between the positive-electrode-collector exposed portion 9 and the negative-electrode-collector exposed portion 12 cannot be caused to take place at a position sufficiently apart from the active material for the electrode. Therefore, an adverse influence on the active material for the electrode cannot be minimized.

Therefore, the electrode-collector exposed portions are disposed on the two sides of the electrodes and their lengths are made to be πd or longer. Thus, the safety of the nonaqueous electrolyte battery 1 can furthermore be improved.

Although the lithium secondary battery has been described in the above-mentioned embodiment, the present invention is not limited to this. The present invention may be applied to a nonaqueous electrolyte battery as well as the lithium secondary battery.

EXAMPLES

Nonaqueous electrolyte batteries having the above-mentioned structure were manufactured so as to be subjected to pressure crush tests.

Example 1

Initially, a positive electrode was manufactured.

Initially, 91 wt % of $MnO_2$, 6 wt % of the conductive material and 3 wt % of the binder were mixed so that a positive-electrode mix was prepared. The conductive material was graphite, while the binder was polyvinylidene fluoride.

Then, the positive-electrode mix was dispersed in N-methyl-2-pyrolidone so as to be slurried. The slurry was uniformly applied to the two sides of aluminum foil which served as a positive electrode collector and which had a thickness of 20 μm. Then, the slurry was dried, and then aluminum foil was compressed and molded by a roll pressing machine. Thus, the positive electrode was manufactured.

At this time, the active material layer for the positive electrode was not formed on either of the two sides at an end of the positive electrode. Therefore, the positive-electrode-collector exposed portion in which the positive electrode collector was exposed was formed. The length of the positive-electrode-collector exposed portion was made to be πd.

Then, a negative electrode was manufactured.

The negative electrode was manufactured by applying metal lithium foil which was an active material for the negative electrode to copper foil which was a negative-electrode collector and which had a thickness of 10 μm.

At this time, the active material layer for the negative electrode was not formed on either of the two sides at an end of the negative electrode. Therefore, the negative-electrode-collector exposed portion in which the negative-electrode collector was exposed was formed. The length of the negative-electrode-collector exposed portion was made to be πd.

The positive electrode, the separator, the negative electrode and the separator were sequentially hermetically stacked in this sequential order. Then, the stacked structure was spirally wound plural times so that a coil was constituted. The separator was made of finely-porous polypropylene film having a thickness of 25 μm.

Then, an insulating plate is inserted into the bottom of a battery can previously plated with nickel and made of iron. Then, the above-mentioned coil was accommodated in the battery can. To collect electric currents of the negative electrode, an end of the negative-electrode lead was crimped to the negative electrode. Another end of the negative-electrode lead was welded to the battery can.

To collect electric currents of the positive electrode, an end of a positive-electrode lead made of aluminum is joined to the positive electrode. Another end of the positive-electrode lead was electrically connected to the battery cover through a current-interrupting thin plate.

Then, a nonaqueous electrolyte was injected into the battery can. The nonaqueous electrolyte was prepared by dissolving $LiPF_6$ in mixed solvent prepared by mixing 50 vol % of propylene carbonate and 50 vol % di-methoxyehtane. The dissolving ratio with respect to the mixed solvent was 1 mol/l.

Finally, the battery can was crimped through an insulating sealing gasket applied with asphalt so that the battery cover was secured. As a result, a cylindrical nonaqueous electrolyte battery having a diameter of about 18 mm and a height of about 65 mm was manufactured.

Example 2

A process similar to that according to Example 1 was performed except for a structure that the length of each of the positive-electrode-collector exposed portion and the negative-electrode-collector exposed portion was made to be 2 πd. Thus, a nonaqueous electrolyte battery was manufactured.

Comparative Example 1

A process similar to that according to Example 1 was performed except for a structure that the positive-electrode-collector exposed portion was not provided for the positive electrode and the negative-electrode-collector exposed portion was not provided for the negative electrode. Thus, a nonaqueous electrolyte battery was manufactured.

Comparative Example 2

A process similar to that according to Example 1 was performed except for a structure that the positive-electrode-collector exposed portion was provided for only either side of the positive electrode. Thus, a nonaqueous electrolyte battery was manufactured.

Comparative Example 3

A process similar to that according to Example 1 was performed except for a structure that the negative-electrode-collector exposed portion was not provided for the negative electrode. Thus, a nonaqueous electrolyte battery was manufactured.

Comparative Example 4

A process similar to that according to Example 1 was performed except for a structure that the positive-electrode-collector exposed portion was provided for only either side of the negative electrode. Thus, a nonaqueous electrolyte battery was manufactured.

Comparative Example 5

A process similar to that according to Example 1 was performed except for a structure that the length of each of the positive-electrode-collector exposed portion and the negative-electrode-collector exposed portion was made to be 0.5 πd. Thus, a nonaqueous electrolyte battery was manufactured.

Comparative Example 6

A process similar to that according to Example 1 was performed except for a structure that the length of the positive-electrode-collector exposed portion was made to be 0.5 πd and that of the negative-electrode-collector exposed portion was made to be πd. Thus, a nonaqueous electrolyte battery was manufactured.

Comparative Example 7

A process similar to that according to Example 1 was performed except for a structure that the length of the positive-electrode-collector exposed portion was made to be πd and that of the negative-electrode-collector exposed portion was made to be 0.5 πd. Thus, a nonaqueous electrolyte battery was manufactured.

A predetermined number of the thus-manufactured nonaqueous electrolyte batteries according to Examples 1 and 2 and Comparative Examples 1 to 7 were prepared. Each of the nonaqueous electrolyte batteries were charged/discharged 100 cycles in a voltage range from 1.5 V to 3.0 V. Then, the nonaqueous electrolyte battery was charged to 3.0 V, and then a pressure crush test was performed.

The nonaqueous electrolyte batteries according to Comparative Examples 1 to 3 incorporated the electrodes having no electrode-collector exposed portion, only either of the electrodes provided with the electrode-collector exposed portion or an electrode having the electrode-collector exposed portion provided for either surface thereof. A portion of the foregoing nonaqueous electrolyte batteries encountered damage, such as heat and/or smoke, of the overall bodies of the batteries.

The nonaqueous electrolyte batteries according to Examples 1 and 2 and having the structure that the electrode-collector exposed portion was provided for each of the two sides of the two electrodes were free from damage, such as heat and/or smoke, of the overall bodies of the batteries.

Therefore, the structure that the electrode-collector exposed portions were provided for the two sides of the two electrodes improved the safety of the nonaqueous electrolyte battery.

In Examples 1 and 2 and Comparative Examples 1 and 5 to 7, experiments were performed such that the length of the positive-electrode-collector exposed portion or that of the negative-electrode-collector exposed portion was changed.

The number of the batteries subjected to the experiments and batteries encountered heat and/or smoke were shown in Table 1.

TABLE 1

| | Length of Positive-Electrode-Collector Exposed Portion | Length of Negative-Electrode-Collector Exposed Portion | Number of Tested Batteries | Number of Batteries Produced Smoke |
|---|---|---|---|---|
| Example 1 | πd | πd | 5 | 0 |
| Example 2 | 2 πd | 2 πd | 5 | 0 |
| Comparative Example 1 | 0 | 0 | 5 | 5 |
| Comparative Example 5 | 0.5 πd | 0.5 πd | 5 | 3 |
| Comparative Example 6 | 0.5 πd | πd | 5 | 2 |

TABLE 1-continued

| | Length of Positive-Electrode-Collector Exposed Portion | Length of Negative-Electrode-Collector Exposed Portion | Number of Tested Batteries | Number of Batteries Produced Smoke |
|---|---|---|---|---|
| Comparative Example 7 | πd | 0.5 πd | 5 | 3 |

As can be understood from Table 1, the nonaqueous electrolyte batteries according to Comparative Examples 1 and 5 to 7 each having the structure that the length of the electrode-collector exposed portion was shorter than πd encountered damage, such as heat and smoke, of the overall bodies of the batteries.

On the other hand, the nonaqueous electrolyte batteries according to Examples 1 and 2 each having the structure that the length of the electrode-collector exposed portion is longer than πd were free from any damage of the overall bodies of the batteries.

Therefore, when the length of the electrode-collector exposed portion is not shorter than πd, the safety of the nonaqueous electrolyte battery can furthermore be improved.

The nonaqueous electrolyte battery according to the present invention is structured such that short circuit takes place between the positive-electrode-collector exposed portion and the negative-electrode-collector exposed portion provided on the two sides of the electrodes. Therefore, heat can be diffused. As a result, any critical influence is not exerted on the active materials for the positive electrode and the negative electrode. Moreover, heat and smoke can be prevented.

The nonaqueous electrolyte battery according to the present invention has the structure that the electrode-collector exposed portions are provided for the two sides of the two electrodes. Moreover, the electrode-collector exposed portion covers the coil one or more times. Therefore, heat and smoke which are produced when the battery has been crushed can furthermore satisfactorily be prevented.

Therefore, damage of the battery and an adverse influence on the environment can be minimized. As a result, a nonaqueous electrolyte battery exhibiting excellent safety and reliability can be provided.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous electrolyte battery comprising:
   a battery can having a top end and a bottom end;
   a battery cover;
   an insulating plate disposed in said battery can adjacent said bottom end; and
   a spiral coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the negative electrode has been formed, wherein,
   the negative electrode of the spiral coil is positioned outer than the positive electrode,
   said positive electrode has a lengthwise directional end and each side of the two sides of the positive-electrode collector adjacent the lengthwise directional end of the positive electrode is exposed forming a positive-electrode-collector exposed portion,
   a length of the positive-electrode-collector exposed portion is greater than or equal to πd, where d is an outer diameter of said spiral coil,
   said negative electrode has a lengthwise directional end and each side of the two sides of the negative-electrode collector adjacent the lengthwise directional end of the negative electrode is exposed forming a negative-electrode-collector exposed portion,
   the negative-electrode-collector exposed portion covers the positive-electrode-collector exposed portion,
   a length of the negative-electrode-collector exposed portion is greater than or equal to πd,
   said positive-electrode-collector exposed portion and said negative-electrode-collector exposed portion cover said coil one or more times through said separator,
   an outermost portion of the spiral coil including the positive-electrode-collector exposed portion and the negative-electrode-collector exposed portion is formed into the separator, and
   said battery cover is coupled to said top end of said battery can; and
   wherein the positive-electrode-collector exposed portion does not engage with the positive-electrode-collector anywhere along an entire length of the positive-electrode-collector exposed portion and the negative-electrode-collector exposed portion.

2. A nonaqueous electrolyte battery according to claim 1, wherein the length of the positive-electrode-collector exposed portion and the length of the negative-electrode-collector exposed portion are the same.

3. A nonaqueous electrolyte battery according to claim 2, wherein each of $L_1$ and $L_2$ is about 2•πd, where the length of said positive-electrode-collector exposed portion is $L_1$ and the length of said negative-electrode-collector exposed portion is $L_2$.

4. A nonaqueous electrolyte battery according to claim 1, wherein said positive-electrode active material is a composite metal oxide expressed by $LiMO_2$ wherein M is selected from the group consisting of Co, Ni, Mn, Fe, Al and Ti.

5. A nonaqueous electrolyte battery according to claim 1, wherein said active material for the negative electrode permits doping and dedoping of lithium ions and is selected from the group consisting of a carbon material, a crystalline metal oxide, and an amorphous metal oxide.

6. A nonaqueous electrolyte battery according to claim 2, wherein each of $L_1$ and $L_2$ is about πd, where the length of said positive-electrode-collector exposed portion is $L_1$ and the length of said negative-electrode-collector exposed portion is $L_2$.

7. A nonaqueous electrolyte battery according to claim 1, wherein the length of the positive-electrode-collector exposed portion is between πd and 2•πd and the length of the negative-electrode-collector exposed portion is between πd and 2•πd.

8. A nonaqueous electrolyte battery according to claim 7, wherein the length of the positive-electrode-collector exposed portion and the length of the negative-electrode-collector exposed portion are the same.

9. A nonaqueous electrolyte battery according to claim 1, wherein said battery cover is coupled to the top end of the battery can by crimping the battery can through an insulating sealing gasket applied with asphalt.

10. The nonaqueous electrolyte battery according to claim 1, wherein the positive-electrode-collector exposed portion and the negative-electrode-collector exposed portion are formed into the separator by sandwiching a single layer of the separator.

11. A nonaqueous electrolyte battery comprising:
a battery can having a top end and a bottom end;
a battery cover;
an insulating plate disposed in said battery can adjacent said bottom end;
a spiral coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the negative electrode has been formed,
wherein,
the negative electrode of the spiral coil is positioned outer than the positive electrode,
said positive electrode has a lengthwise directional end and each side of the two sides of the positive-electrode collector adjacent the lengthwise directional end of the positive electrode is exposed forming a positive-electrode-collector exposed portion,
a length of the positive-electrode-collector exposed portion is greater than or equal to $\pi d$, where d is an outer diameter of said spiral coil,
said negative electrode has a lengthwise directional end and each side of the two sides of the negative-electrode collector adjacent the lengthwise directional end of the negative electrode is exposed forming a negative-electrode-collector exposed portion,
the negative-electrode-collector exposed portion covers the positive-electrode-collector exposed portion,
a length of the negative-electrode-collector exposed portion is greater than or equal to $\pi d$,
said positive-electrode-collector exposed portion and said negative-electrode-collector exposed portion cover said coil one or more times through said separator,
an outermost portion of the spiral coil including the positive-electrode-collector exposed portion and the negative-electrode-collector exposed portion is formed into the separator,
said battery cover is coupled to said top end of said battery can,
an inner separator layer is situated between the positive-electrode-collector exposed portion and the negative-electrode-collector exposed portion, and
outer separator layers are situated on one side of both the positive-electrode-collector exposed portion and the negative-electrode-collector exposed portion, and
the inner separator layer and the outer separator layers are approximately the same length as the positive-electrode-collector exposed portion and the negative-electrode-collector exposed portion.

12. A nonaqueous electrolyte battery comprising:
a battery can having a top end and a bottom end;
a battery cover;
an insulating plate disposed in said battery can adjacent said bottom end; and
a spiral coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the negative electrode has been formed,
wherein,
the negative electrode of the spiral coil is positioned outer than the positive electrode,
said positive electrode has a lengthwise directional end and each side of the two sides of the positive-electrode collector adjacent the lengthwise directional end of the positive electrode is exposed forming a positive-electrode-collector exposed portion,
a length of the positive-electrode-collector exposed portion is greater than or equal to $\pi d$, where d is an outer diameter of said spiral coil,
said negative electrode has a lengthwise directional end and each side of the two sides of the negative-electrode collector adjacent the lengthwise directional end of the negative electrode is exposed forming a negative-electrode-collector exposed portion,
the negative-electrode-collector exposed portion covers the positive-electrode-collector exposed portion,
a length of the negative-electrode-collector exposed portion is greater than or equal to $\pi d$,
said positive-electrode-collector exposed portion and said negative-electrode-collector exposed portion cover said coil one or more times through said separator,
an outermost portion of the spiral coil including the positive-electrode-collector exposed portion and the negative-electrode-collector exposed portion is formed into the separator,
said battery cover is coupled to said top end of said battery can, and
the positive-electrode-collector exposed portion and the negative-electrode-collector exposed portion do not contact an active material layer anywhere along the entire lengths of the positive-electrode-collector exposed portion and the negative-electrode-collector exposed portion.

13. The nonaqueous electrolyte battery according to claim 1, wherein the positive-electrode-collector exposed portion and the negative-electrode-collector exposed portion are safety layers surrounding an outermost portion of the spiral coil which short circuit when the battery is subjected to compression forces beyond a predetermined threshold and diffuse heat from the short circuit to an outside of the spiral coil.

14. A nonaqueous electrolyte battery comprising:
a battery can having a top end and a bottom end;
a battery cover;
an insulating plate disposed in said battery can adjacent said bottom end; and
a spiral coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the negative electrode has been formed,
wherein,
the negative electrode of the spiral coil is positioned outer than the positive electrode, said positive electrode has a lengthwise directional end and each side of the two sides of the positive-electrode collector adjacent the lengthwise directional end of the positive electrode is exposed forming a positive-electrode-collector exposed portion, a length of the positive-electrode-collector exposed portion is greater than or equal to πd, where d is an outer diameter of said spiral coil, said negative electrode has a lengthwise directional end and each side of the two sides of the negative-electrode collector adjacent the lengthwise directional end of the negative electrode is exposed forming a negative-electrode-collector exposed portion, the negative-electrode-collector exposed portion covers the positive-electrode-collector exposed portion, a length of the negative-electrode-collector exposed portion is greater than or equal to πd, said positive-electrode-collector exposed portion and said negative-electrode-collector exposed portion cover said coil one or more times through said separator, an outermost portion of the spiral coil including the positive-electrode-collector exposed portion and the negative-electrode-collector exposed portion is formed into the separator, said battery cover is coupled to said top end of said battery can, and the positive-electrode-collector exposed portion and the negative-electrode-collector exposed portion have less material therebetween than the positive-electrode-collector and the negative-electrode-collector along an entire length of the positive-electrode-collector exposed portion and the negative-electrode-collector exposed portion, said less material being of an amount that does not vary along the entire lengths of the positive-electrode-collector exposed portion and the negative-electrode-collector exposed portion.

15. The nonaqueous electrolyte battery according to claim 1, wherein the positive-electrode-collector exposed portion and the negative-electrode-collector exposed portion are separated by a short-circuit layer which effects a short circuit between the positive-electrode-collector exposed portion with the negative-electrode-collector exposed portion upon compression of the nonaqueous electrolyte battery beyond a predetermined threshold.

16. The nonaqueous electrolyte battery according to claim 1, wherein the positive-electrode-collector exposed portion and the negative-electrode-collector exposed portion start at a first point and end at a second point to completely surround the positive-electrode-collector and the negative-electrode-collector, and wherein there is no active material located anywhere between the first point and the second point.

17. The nonaqueous electrolyte battery according to claim 1, wherein the positive-electrode-collector exposed portion is longer than the positive-electrode-collector so that the positive-electrode-collector is completely enclosed by the positive-electrode-collector exposed portion.

18. The nonaqueous electrolyte battery according to claim 1, wherein the positive-electrode-collector exposed portion and the negative-electrode-collector exposed portion start at a first point and end at a second point to completely surround an outermost portion of the spiral coil, and wherein there is no active material located anywhere between the first point and the second point.

19. A nonaqueous electrolyte battery comprising:
a battery can having a top end and a bottom end;
a battery cover;
an insulating plate disposed in said battery can adjacent said bottom end; and
a spiral coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the negative electrode has been formed,
wherein,
the negative electrode of the spiral coil is positioned outer than the positive electrode,
said positive electrode has a lengthwise directional end and each side of the two sides of the positive-electrode collector adjacent the lengthwise directional end of the positive electrode is exposed forming a positive-electrode-collector exposed portion,
a length of the positive-electrode-collector exposed portion is greater than or equal to πd, where d is an outer diameter of said spiral coil,
said negative electrode has a lengthwise directional end and each side of the two sides of the negative-electrode collector adjacent the lengthwise directional end of the negative electrode is exposed forming a negative-electrode-collector exposed portion,
the negative-electrode-collector exposed portion covers the positive-electrode collector exposed portion,
a length of the negative-electrode-collector exposed portion is greater than or equal to πd,
said positive-electrode-collector exposed portion and said negative-electrode-collector exposed portion cover said coil one or more times through said separator,
an outermost portion of the spiral coil including the positive-electrode-collector exposed portion and the negative-electrode-collector exposed portion is formed into the separator,
said battery cover is coupled to said top end of said battery can,
the positive-electrode-collector exposed portion and the negative-electrode-collector exposed portion start at a same start location along the spiral coil with respect to each other, and
the positive-electrode-collector exposed portion and the negative-electrode-collector exposed portion end at a same end location along the spiral coil with respect to each other.

20. A nonaqueous electrolyte battery comprising:
a battery can having a top end and a bottom end;
a battery cover;
an insulating plate disposed in said battery can adjacent said bottom end; and
a spiral coil formed by, through a separator, winding a positive electrode which incorporates an elongated positive-electrode collector having two sides on each of which an active material for the positive electrode has been formed and a negative electrode which incorporates an elongated negative-electrode collector having two sides on each of which an active material for the neciative electrode has been formed,
wherein,
the negative electrode of the spiral coil is positioned outer than the positive electrode,
said positive electrode has a lengthwise directional end and each side of the two sides of the positive-electrode collector adjacent the lengthwise directional end of the positive electrode is exposed forming a positive-electrode-collector exposed portion, a length of the positive-electrode-collector exposed portion is greater than or equal to πd, where d is an outer diameter of said spiral coil, said negative electrode has a lengthwise directional end and each side of the two sides of the negative-electrode collector adjacent the lengthwise directional end of the negative electrode is exposed forming a negative-electrode-collector exposed portion, the negative-electrode-collector exposed portion covers the positive-electrode-collector exposed portion, a length of the negative-electrode-collector exposed portion is greater than or equal to πd, said positive-electrode-collector exposed portion and said negative-electrode-collector exposed portion cover said coil one or more times through said separator, an outermost portion of the spiral coil including the positive-electrode-collector exposed portion and the negative-electrode-collector exposed portion is formed into the separator, said battery cover is coupled to said top end of said battery can, and the same start location and the same end location are located laterally at positions that are radial with respect to each other and from a center of the spiral coil.

* * * * *